United States Patent
Wilson et al.

(10) Patent No.: US 9,692,861 B1
(45) Date of Patent: Jun. 27, 2017

(54) INTERNAL MAGNETIC LOCKING FOR MOBILE DEVICES

(71) Applicant: Motorola Mobility LLC, Chicago, IL (US)

(72) Inventors: Jacob D Wilson, Schaumburg, IL (US); Daniel P Dondzik, Elk Grove Village, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/973,761

(22) Filed: Dec. 18, 2015

(51) Int. Cl.
 *H04M 1/02* (2006.01)
(52) U.S. Cl.
 CPC ....... *H04M 1/0249* (2013.01); *H04M 1/0266* (2013.01)
(58) Field of Classification Search
 CPC .. H04M 1/0249; H04M 1/0266; H04M 1/026; G06F 1/1637; H05K 5/0017; H05K 5/0204
 See application file for complete search history.

(56) References Cited

U.S. PATENT DOCUMENTS

| | | | |
|---|---|---|---|
| 2011/0211324 A1* | 9/2011 | Murakami | H04M 1/0266 361/807 |
| 2015/0195937 A1* | 7/2015 | Tsai | G06F 1/18 455/575.8 |
| 2016/0044816 A1* | 2/2016 | Jarvis | H01R 43/205 361/759 |

OTHER PUBLICATIONS

Nokia, "Nokia X7 Symbian Smartphone Gets FCC Teardown", http://www.slashgear.com/nokiax7symbiansmartphonegetsfccteardown16152324/, Dec. 13, 2015, 8 pages.
Safety 1st, "Safety 1st Magnetic Lock System", http://www.walmart.com/ip/Safety1stMagneticLockSystem/16782921, Dec. 13, 2015, 7 pages.

* cited by examiner

*Primary Examiner* — Nam Huynh
(74) *Attorney, Agent, or Firm* — Miller, Matthias & Hull LLP (57) ABSTRACT

Systems and methods for assembling a mobile cellular device do not require screws or adhesives, allowing for more efficient and less wasteful rework of the device when needed. In an embodiment, one or more fixed lock elements are attached to one a screen assembly of the device (or the device housing) and a locking shaft is retained in the housing (or the screen assembly). The locking shaft includes blocking sections that block passage of the lock elements, and non-blocking sections that permit passage of at least part of each lock element. In this way, when the screen assembly is mated to the housing, each lock element aligns with and at least partially passes over one of the non-blocking sections, such that when the locking shaft is slid axially, the lock elements align with and are retained by the blocking sections.

19 Claims, 6 Drawing Sheets

Figure 6

INTERNAL MAGNETIC LOCKING FOR MOBILE DEVICES

TECHNICAL FIELD

The present disclosure is related generally to mobile device structure and construction, and, more particularly, to a system and method for securing one part of such a device to another.

BACKGROUND

Mobile device construction typically employs one or both of screws and adhesives to lock major structures together, e.g., housings, printed circuit boards (PCBs), and display assemblies. When reworking assemblies in which adhesives have been used, it is generally necessary to apply heat or chemicals to breakdown the adhesives in order to pry the assemblies apart.

In assemblies in which screws have been used to hold parts together, these parts may be disassembled once or twice generally before further manipulation results in stripped thread bosses. As with adhered assemblies, the reworking of screwed assemblies requires tools. In addition screws typically need to be covered after assembly so that they are not visible or accessible to the end consumer.

The present disclosure is directed to a system that can eliminate certain shortcomings of present systems. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this Background section as admitted or assumed prior art. Moreover, the identification herein of desirable courses of action reflects the inventors' own observations and ideas, and should not be assumed to indicate an art-recognized desirability.

SUMMARY

In an embodiment of the disclosed principles, a mobile cellular device is provided having a housing and a screen assembly. One or more locking bars are affixed to one of the housing and the screen assembly, and a locking shaft is retained in the other of the housing and the screen assembly. The locking rod includes one or more large diameter sections and one or more smaller diameter sections, such that when the screen assembly is mated to the housing, the one or more locking bars align with and pass over respective one or more smaller diameter sections. When the locking rod is slid axially, the one or more locking bars align with and are retained respective one or more large diameter sections.

In another embodiment, the mobile cellular device includes one or more locks affixed to one of the housing and the screen assembly and a locking shaft retained in the other of the housing and the screen assembly. The locking shaft includes one or more blocking sections that block passage of respective ones of the locks, and one or more non-blocking sections that permit passage of at least a portion of respective ones of the locks. In this way, when the screen assembly is mated to the housing, each of the locks aligns with and at least partially passes over a respective one of the non-blocking sections, and when the locking shaft is slid axially, the locks align with and are retained by respective ones of the blocking sections.

In a method of assembling a mobile cellular device in accordance with yet another embodiment of the disclosed principles, a resilient gasket is placed between the top half and the bottom half of the device, and a compressive force is applied, compressing the top half and a bottom half together. This compresses the resilient gasket and allows a sliding a rod within the bottom to be slid into an interference fit relative to a protrusion extending from the top half. Releasing the compressive force causes the resilient gasket to at least partially rebound and traps the rod and protrusion together.

Other features and embodiments of the disclosed principles will be appreciated from the detailed description herein, including the figures. It will be appreciated that this document describes example embodiments and does not limit the claims to such embodiments. Rather those of skill in the art will appreciate that embodiments and features other than those shown may be used without departing from the scope of the disclosed principles.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

As noted above, mobile device construction typically employs screws and adhesives to lock major structures together, e.g., housings, printed circuit boards (PCBs), and display assemblies. When reworking these assemblies where adhesives have been used, heat or chemicals are generally applied to breakdown the adhesives in order to pry the assemblies apart. This process may damage device displays and lenses, as well as cosmetic surfaces.

In assemblies wherein screws have been used to hold parts together, these parts may be disassembled once or twice generally before further working strips or compromises screw hole threads in attachment bosses. Moreover, as with adhered assemblies, the reworking of screwed assemblies requires tools and may result in damage to various parts of the device.

When damage occurs using either technology, costs are often incurred for replacing or scrapping the affected parts. Moreover, even if rework is performed without damaging any parts of the device, the use of screws and adhesives generally precludes any entity outside of an assembly plant from making changes or additions to the device. Thus, for example, later customization steps, sometimes referred to herein as "postponable steps," are difficult to perform other than at the place and time of device assembly.

To at least partly ameliorate one or more of the issues noted above, an embodiment of the disclosed principles employs a latching rod attachment system to attach an "internals" assembly (e.g., the main display assembly bonded to PCBs, batteries, carriers with cameras and so on) to the device shell or housing. The internals assembly in accordance with this embodiment includes either a sliding lock rod or one or more mating latches, and the device shell includes the other of these two features so as to provide an interlocking attachment via interaction of the sliding lock rod and the mating latches.

A resilient gasket or other compressible structure is located at the periphery of the internals assembly, between the internals assembly and the device shell in an embodiment. This gasket seals the internal cavity of the device and also enables assembly and retention as explained more fully below, without adhesives or threaded fasteners such as screws.

For assembly, the combined but not yet latched device, including the internals assembly and the device shell, is pressed together, compressing the resilient gasket. This step may be accomplished via a press or other fixture or may be manually executed. The compression of the internals assembly into the shell pushes the locking rod past the mating locking features, and while the device is still compressed, the locking rod is slid into an interference position relative to the mating locking features. In an embodiment, the locking rod includes a permanent magnet at one or both ends thereof, and one or more magnets outside the device are slid along the device to move the locking rod into the interference position.

In a further embodiment, the locking rod includes one or more posts, and the external magnets are rotated to rotate the locking rod so that the posts lock into additional interlocking features. At this point in the assembly process, the compression force on the device is released, allowing the internals assembly to move slightly away from the device housing under the force of the gasket, setting the interlocking features. With the locking rod and mating latches engaged, the mobile device is fully secured without requiring the use of adhesives or threaded fasteners to retain the major subassemblies.

For the purpose of rework, the assembled device may be re-compressed, e.g., in the same or different fixture, and the magnets rotated and slid in the opposite directions and sequence from their original movements in order to unlock the device. At this point, the entire assembly can be separated easily into its subassemblies with no need to unscrew fasteners or remove adhesives. This allows for convenient and safe rework, e.g., if an assembly error has occurred.

For example, the device may need to be reworked if the wrong color housing was used, if a device housing has been found to be scratched, or if any other situation occurs in which the assembled device needs to be taken apart for modification. Using embodiments of the disclosed principles to assemble the device and retain its subassemblies, there is much less risk of damaging any component, including the expensive lens assembly, during any needed disassembly and reassembly.

Figure 1:
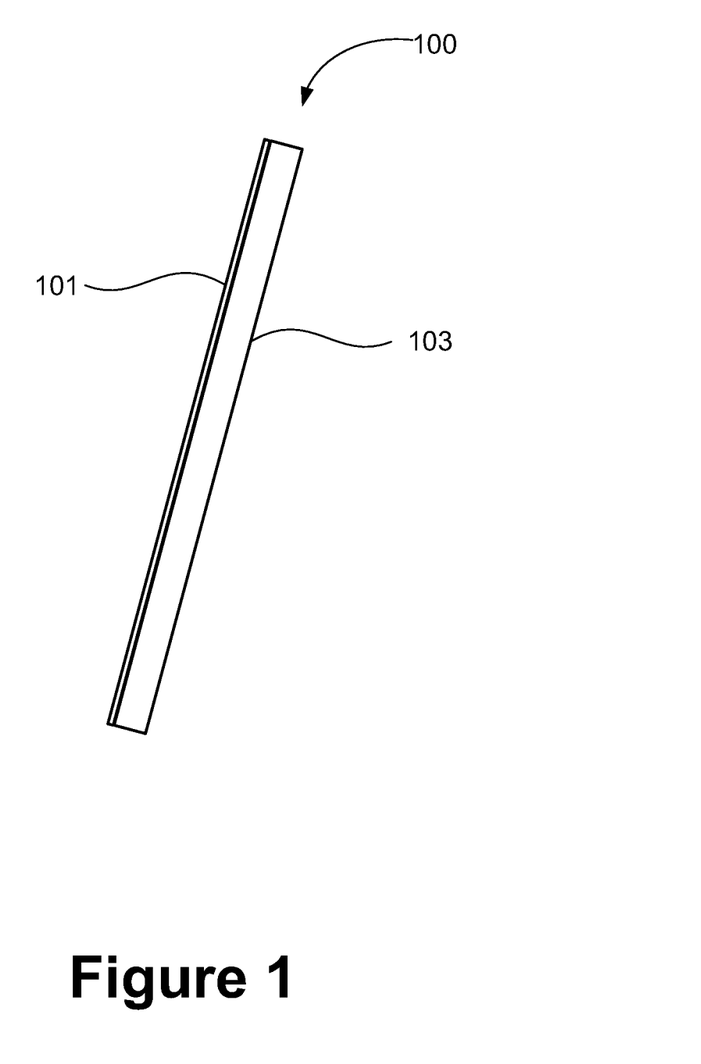
FIG. 1 is a side view of a two part device within which embodiments of the disclosed principles may be implemented.

With this overview in mind, and turning now to a more detailed discussion in conjunction with the attached figures, FIG. 1 is a perspective view of a generic device design. In particular, the illustrated device 100 includes an upper half 101 and a lower half 103 joined at a parting line 105. It will be appreciated that one half may utilize an inset on the face thereof while the other half may utilized a raised peripheral lip in order to align the subassemblies and prevent lateral movement of either portion relative to the other in the assembled device.

In a typical construction, the halves 101, 103 would be retained by screws or adhesive. Although not visible in the illustrated view, it will be appreciated that the lower half 103 is essentially a shell or bucket that surrounds components that are part of the top half 101. The top half 101 includes primarily a display and associated components (not shown) such as batteries, circuitry, PCBs, framing and structural components.

Figure 2:
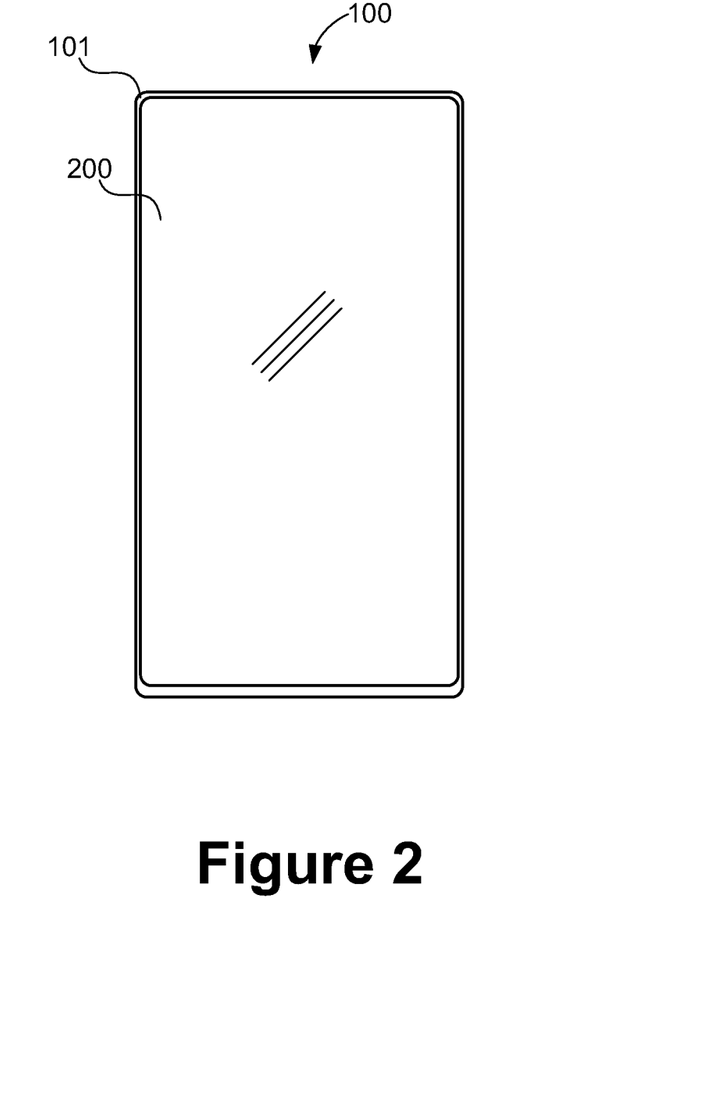
FIG. 2 is a front view of a two part device within which embodiments of the disclosed principles may be implemented.

FIG. 2 shows a front schematic view of the device 100 of FIG. 1. In this view, the external surface of the top half 101 can be seen. A display screen 200 is shown on the front surface. Although the illustrated screen 200 covers essentially all of the outward-facing external surface of the top half 101, it is contemplated that a smaller portion of the surface may instead be covered and that other features may be present on the illustrated surface. Such other features may include speakers, button and so on.

During rework of the device 100, it would typically be necessary to separate the upper half 101 of the device 100 from the lower half 103 of the device 100 in order to replace one or the other or to replace or repair an internal component. As such, if the halves 101, 103 are held together by an adhesive or by threaded fasteners, then these must be removed or unscrewed to allow access.

Figure 3:
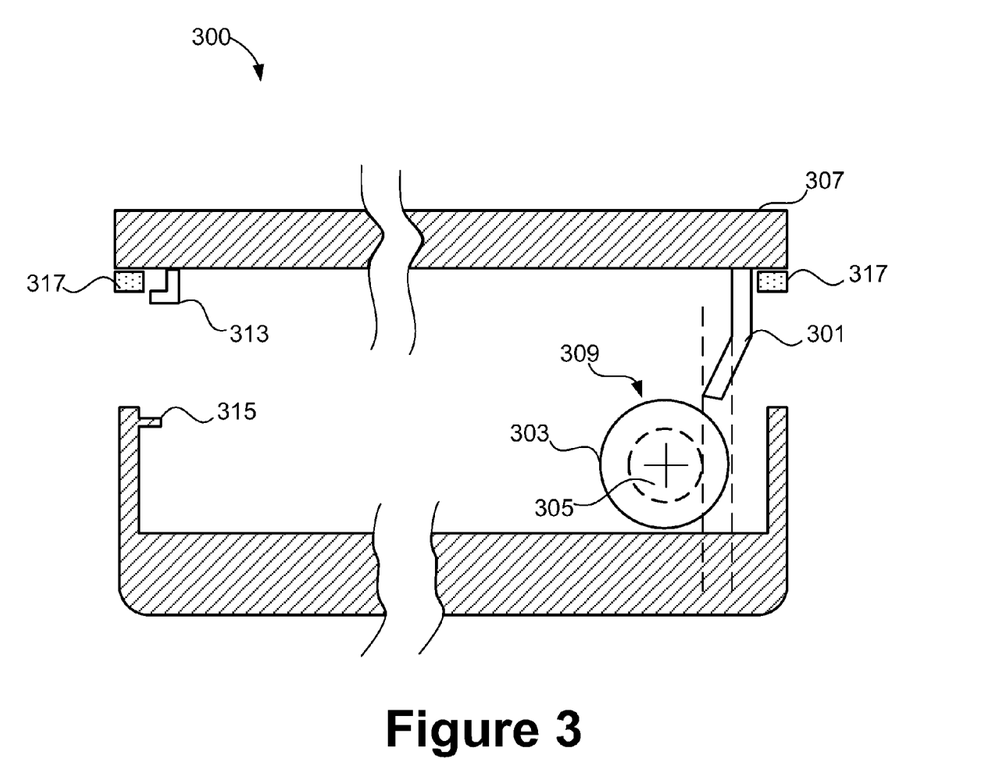
FIG. 3 is a partial cross-sectional end view of a device including a locking system in accordance with an embodiment of the disclosed principles.

However, in an embodiment of the disclosed principles, a device such as device 100 of FIG. 1 is held together in its assembled configuration without the use of either adhesives or threaded fasteners. The disclosed fastening system, an embodiment of which is shown in axial cross-section in FIG. 3, includes two portions that interlock to retain the device 100 in the assembled configuration. The schematic illustration of FIG. 3 shows these two portions without the surrounding device components for clarity.

The first portion of the locking system 300 comprises one or more locking bars 301, which may be attached to a locking bar rail 307 or may be directly attached to a device half such as the top half 101. The second portion of the locking system 300 comprises a locking rod 309 secured to the other half of the device 100 such that it may slide along its axis and turn about its axis relative to the associated device half, but cannot move substantially in any other directions. The locking rod 309 has an outer surface 303 and includes one or more waisted sections 305. In an embodiment, the locking rod 309 also includes a permanent magnet, e.g., on one rod end or the other (not shown in FIG. 3).

In an embodiment of the disclosed principles, a "ski boot" type latch is employed to secure the opposite edge of each half 101, 103. This latch includes one or more tabs 313 and one or more corresponding catches or slots 315 on the opposite half 103. It will be appreciated that the illustrated features in FIG. 3 are not drawn to scale, and may be much smaller or larger than shown, relative to the dimensions of other parts such as the top and bottom device halves 101, 103.

Figure 4:
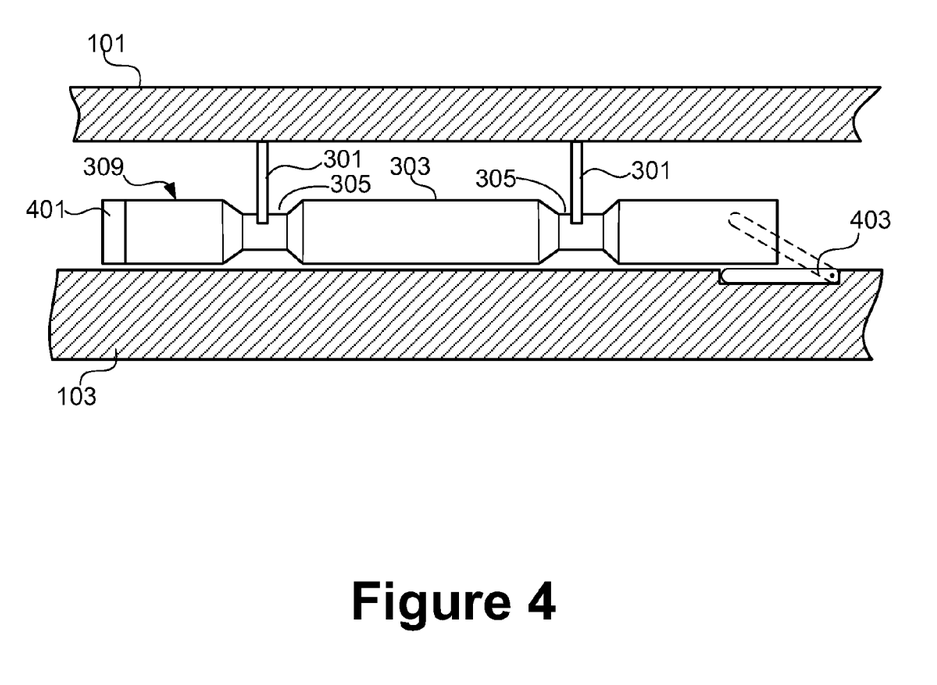
FIG. 4 is a partial cross-sectional side view of a device including a locking system in accordance with an embodiment of the disclosed principles, wherein locking features are aligned.

A side view of the locking rod 309 and the locking bars 301 is shown in FIG. 4. In this view, the permanent magnet 401 mentioned above can be seen. In addition, a rod end latch 403 is shown. This feature is configured to snap upward and retain the locking rod 309 in the locked state once this state is reached as will be discussed more fully below.

When the tabs 313 of the latch system are engaged in the corresponding openings 315 on the opposite half 103, the one or more locking bars 301 are vertically aligned with the one or more waisted sections 305 of the locking rod 309. In this way, when the device 100 is closed by swinging the two halves 101, 103 together, the one or more locking bars 301 pass over the one or more waisted sections 305 of the locking rod 309, allowing the halves 101, 103 to meet as shown in FIG. 5.

In this configuration, the one or more locking bars 301 prevent the locking rod 309 from sliding along its axis due to interference with the larger diameter sections adjacent each waisted section 305, 313. However, if the device halves 101, 103 are now compressed further together, the lower portions of the one or more locking bars 301 drop below the diameter of the larger diameter sections 305 of the locking rod 309.

Figure 6:
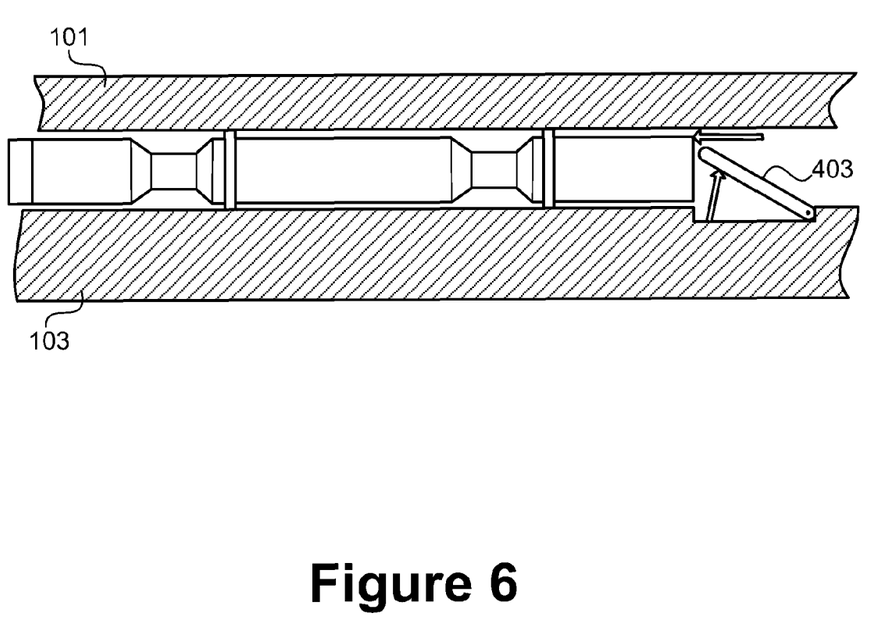
FIG. 6 is a partial cross-sectional side view of a device including a locking system in accordance with an embodiment of the disclosed principles, wherein the device halves are compressed together and the locking rod has been slid into a locking position.

At this point, the locking rod 309 can be slid along its axis by an applied force, e.g., via an external magnet interacting with the magnet 401 on the locking rod 309. This configuration is shown in the illustration of FIG. 6. As can be seen, the locking rod 309 has moved to the left in the illustrated perspective, causing the larger diameter sections 305 of the locking rod 309 to interact with the inwardly bent ends of locking bars 301.

Figure 5:
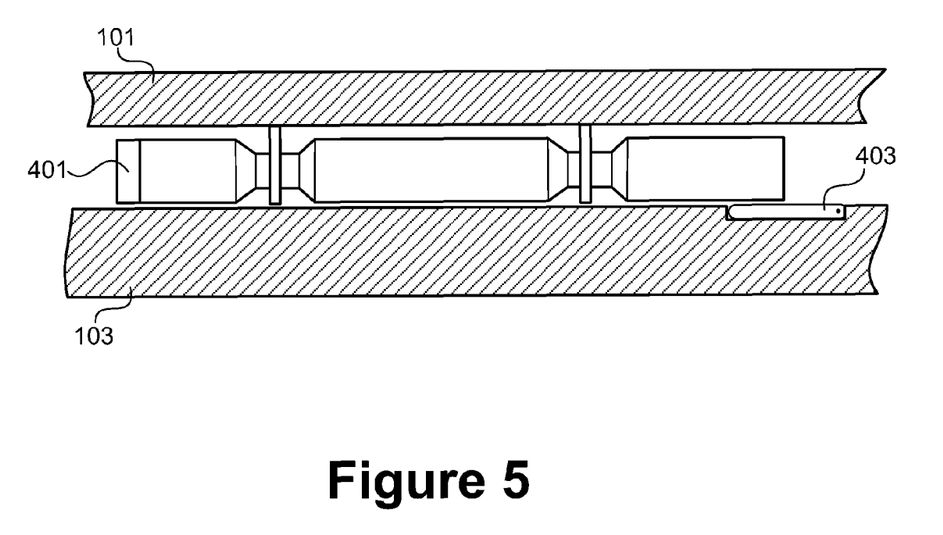
FIG. 5 is a partial cross-sectional side view of a device including a locking system in accordance with an embodiment of the disclosed principles, wherein locking features are aligned and the device halves are compressed together.

When the compression force on the device 100 is released, the two halves 101, 103 are locked together via the interference of the locking bars 301 and the larger diameter sections 303 of the locking rod 309 as shown in FIG. 5. In an embodiment, an elastomeric gasket 317 (FIG. 3) is situated between the halves 101, 103 prior to assembly. This gasket 317 provides a rebounding force, against which the two halves 101, 103 are compressed and via which the components are held in the locked position when the compression force is released. It will be appreciated that other rebounding mechanisms such as springs may be used without departing from the disclosed principles.

Because the force used to move the rod 309 into the locked position is supplied magnetically rather than by direct contact, the moving and interfering parts are low friction parts in an embodiment of the disclosed principles. The low friction characteristic may be a result of the use of low friction materials, or may be accomplished by highly polishing metal surfaces. The sources of friction to be minimized in this embodiment include primarily friction due to tolerance and rod-to-feature alignment.

Thus, in a further embodiment, oversized through features are used that tighten on the release of compression. To ameliorate slight misalignment of features, and hence binding, lead in surfaces may be used as well. Further, although the disclosed embodiments to this point utilize a locking rod, it will be appreciated that other structures are apparent from this disclosure. For example, two rods may be used, with one located on each side of the device 100.

Although the illustrated locking system uses a sliding rod that is maintained in the locked position by a lifting latch, it will be appreciated that other means for maintaining the position of the rod may be used. For example, in an embodiment, the locking rod 309 includes one or more studs or outcrops that lock into the device structure and prevent the rod from sliding. In a further embodiment, the studs or outcrops are locked into the device structure via a partial rotation of the rod 309.

In another embodiment, a rail lock is used in lieu of or in addition to a rod lock. This embodiment is similar to the locking rod system, except that the rod, which may be on either half, is replaced with a rail. The rail is free to slide axially during assembly but may not rotate. The rail will also typically require less device volume for use. Herein, the term locking shaft refers to an elongated structure that is either a rod or a rail.

Although the embodiments described thus far utilize magnetic force to actuate the locking rod or rail, it will be appreciated that it is not required to have a permanent magnet on the rod or rail for all embodiments. Indeed, in environments where a permanent magnet would otherwise cause problems such, as by saturating of the magnetic field to other metal parts in the phone, the rod magnet may be omitted. In this embodiment, the rod or rail is made of or includes a material that is not magnetized but is simply magnetically responsive. For example, the rod or rail may be or contain iron or other magnetically responsive substance. In an embodiment, the actuation field is set so as to not permanently cause substantial magnetization in the rod or rail. The term "lock" may be used herein to encompass a structure that is either a locking bar that locks to a locking shaft (rail or rod) or another structure (e.g., a stud, rail, inverted top hat, etc.) that locks to the locking shaft (rod or rail).

As noted above, a compression fixture having a magnet for actuation may be used. In this embodiment, the magnet may be either a permanent magnet or an electromagnet (or, if desired, an electropermanent magnet). Of these, an electromagnet would allow for use of the same fixture to both lock and unlock the rod, since the polarity could be easily reversed.

While there are other application scenarios for the illustrated locking system and process, this document will not attempt to catalog all such uses. Those of skill in the art will appreciate that there are many possible embodiments to which the principles of the present disclosure may be applied. The embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile cellular device comprising:
a housing having an open top;
a screen assembly including at least a display screen and a battery;
one or more locking bars affixed to a first one of the housing and the screen assembly; and
a locking rod substantially parallel to the display screen and retained to a second one of the housing and the screen assembly, the locking rod having at least one large diameter section and at least one smaller diameter section, such that when the screen assembly is mated to the housing via the open top of the housing, the one or more locking bars align with and pass over the at least one smaller diameter section, and when the locking rod is slid axially, the one or more locking bars align with and are retained by the least one large diameter section.

2. The mobile cellular device in accordance with claim 1, further comprising a resilient member disposed between the housing and the screen assembly, the resilient member being compressible during assembly of the device to allow sliding of the locking rod, and rebounding of the resilient member holding the locking rod stationary after assembly.

3. The mobile cellular device in accordance with claim 1, wherein the one or more locking bars are affixed to the screen assembly.

4. The mobile cellular device in accordance with claim 1, wherein the locking rod is retained by the housing.

5. The mobile cellular device in accordance with claim 1, wherein the one or more locking bars include at least two locking bars.

6. The mobile cellular device in accordance with claim 1, wherein the locking rod includes a magnet usable to move the rod via a magnet external to the device.

7. The mobile cellular device in accordance with claim 4, wherein the locking rod includes one or more studs that when rotated form an interference relationship with a portion of the housing.

8. The mobile cellular device in accordance with claim 1, further comprising a locking latch that holds the locking rod in its locked position.

9. The mobile cellular device in accordance with claim 1, further comprising at least one tongue on one of the housing and the screen assembly and a mating feature on the other of the housing and the screen assembly, with the tongue and mating feature being located so that when the tongue and mating feature are engaged, the one or more locking bars align with the at least one smaller diameter section of the locking rod.

10. A mobile cellular device comprising:
a housing;
a screen assembly including at least a display screen;
one or more locks affixed to a first one of the housing and the screen assembly; and
a locking shaft retained to a second one of the housing and the screen assembly, the locking shaft having one or more blocking sections sized to block passage of respective ones of the one or more locks, and having one or more non-blocking sections sized to permit passage of at least a portion of the respective ones of the one or more locks, such that when the screen assembly is mated to the housing via the open top of the housing, each of the one or more locks aligns with and at least partially passes over a respective one of the one or more non-blocking sections, and when the locking shaft is slid axially, the one or more locks align with and are retained by respective ones of the one or more blocking sections.

11. The mobile cellular device in accordance with claim 10, further comprising a resilient member disposed between the housing and the screen assembly, the resilient member being compressible during assembly of the device to allow sliding of the locking shaft, with rebounding of the resilient member holding the locking shaft stationary after assembly.

12. The mobile cellular device in accordance with claim 10, wherein the one or more locks are affixed to the screen assembly.

13. The mobile cellular device in accordance with claim 10, wherein the locking shaft is retained by the housing.

14. The mobile cellular device in accordance with claim 10, wherein the one or more locks include at least two locks.

15. The mobile cellular device in accordance with claim 10, wherein the locking shaft includes a magnet usable to move the locking shaft via a magnet external to the device.

16. The mobile cellular device in accordance with claim 13, wherein the locking shaft is a rod and includes one or more studs that form an interference relationship with a portion of the housing when the rod is rotated axially.

17. The mobile cellular device in accordance with claim 13, wherein the locking shaft is a rail.

18. The mobile cellular device in accordance with claim 10, further comprising a locking latch that holds the locking shaft in its locked position.

19. The mobile cellular device in accordance with claim 10, further comprising at least one tongue on one of the housing and the screen assembly and a mating feature on the other of the housing and the screen assembly, with the tongue and mating feature being located so that when the tongue and mating feature are engaged, the one or more locks align with the one or more non-blocking sections of the locking shaft.

* * * * *